United States Patent
Connor et al.

(10) Patent No.: US 7,373,419 B2
(45) Date of Patent: May 13, 2008

(54) METHOD, SYSTEM, AND ARTICLE OF MANUFACTURE FOR INCREASING NETWORK THROUGHPUT

(75) Inventors: Patrick L. Connor, Portland, OR (US); Eric K. Mann, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 10/313,380

(22) Filed: Dec. 6, 2002

(65) Prior Publication Data

US 2004/0111503 A1    Jun. 10, 2004

(51) Int. Cl.
*G06F 15/16* (2006.01)
*G06F 12/01* (2006.01)
(52) U.S. Cl. .................. 709/235; 709/233; 718/105
(58) Field of Classification Search ........ 709/223–226, 709/250, 227–229, 230–235; 718/105; 370/231, 370/232, 235
See application file for complete search history.

(56) References Cited

U.S. PATENT DOCUMENTS

| | | | |
|---|---|---|---|
| 6,473,793 B1 * | 10/2002 | Dillon et al. | 709/223 |
| 6,728,213 B1 * | 4/2004 | Tzeng et al. | 370/235 |
| 6,731,740 B1 * | 5/2004 | Choudhury et al. | 379/221.03 |
| 6,870,810 B1 * | 3/2005 | Cohen | 370/229 |
| 6,980,515 B1 * | 12/2005 | Schunk et al. | 370/230.1 |
| 6,993,613 B2 * | 1/2006 | Connor et al. | 710/260 |
| 7,032,023 B1 * | 4/2006 | Barrett et al. | 709/225 |
| 2003/0154272 A1 * | 8/2003 | Dillon et al. | 709/223 |

OTHER PUBLICATIONS

10 Gigabit Ethernet Alliance, "10 Gigabit Ethernet Technology Overview White Paper", Revision 2, Draft A, Apr. 2002, pp. 1-16.
U.S. Appl. No. 10/326,740, filed Dec. 20, 2002, entitled "Method, System, and Article of Manufacture for Adjusting Interrupt Levels", invented by P. L. Connor, E. K. Mann, H. T. Tran, P. Govindarajan, J. P. Jacobs, D. M. Durham, G. D. Gumanow, and C. Y. Chiu.

* cited by examiner

*Primary Examiner*—Zarni Maung
(74) *Attorney, Agent, or Firm*—Konrad Raynes & Victor LLP; Rabindranath Dutta

(57) ABSTRACT

Provided are a method, system, and article of manufacture for managing network throughput. An application identifies at least one network connection of a plurality of network connections, wherein packets arriving via the one network connection require greater resources at a computational device relative to resources required by other network connections. The application determines if resources required at the computational device by the plurality of network connections exceed a threshold and eliminates the at least one network connection to the computational device.

20 Claims, 6 Drawing Sheets

METHOD, SYSTEM, AND ARTICLE OF MANUFACTURE FOR INCREASING NETWORK THROUGHPUT

BACKGROUND OF THE INVENTION

1. Field of the Invention

The present invention relates to a method, system, and an article of manufacture for increasing network throughput.

2. Description of the Related Art

A computational device, such as a server, may have a plurality of network connections to one or more clients across a network. The server may have an Input/Output (I/O) controller to facilitate the flow of packets between the server and the clients over the network connections.

In certain situations, the I/O controller may have to drop packets that arrive over the network connections. Such situations may arise when the inbound packet rate from the network exceeds the rate at which the packets can be processed by the server. I/O controllers may have memory buffers that allow short bursts of network traffic to be buffered when the processing rate of the server is exceeded. However, regardless of the buffering capabilities of the I/O controller if the sustained rate of inbound traffic exceeds the rate at which the I/O controller can process the traffic then the memory buffer will be exceeded and packet loss may occur.

When a potential for packet loss is imminent, the server may eliminate certain network connections either randomly or based on certain static priorities of the connections. However, notwithstanding the earlier techniques for eliminating network connections, there is a need in the art for improved implementations for eliminating network connections.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments. It is understood that other embodiments may be utilized and structural and operational changes may be made without departing from the scope of the present embodiments.

Figure 1:
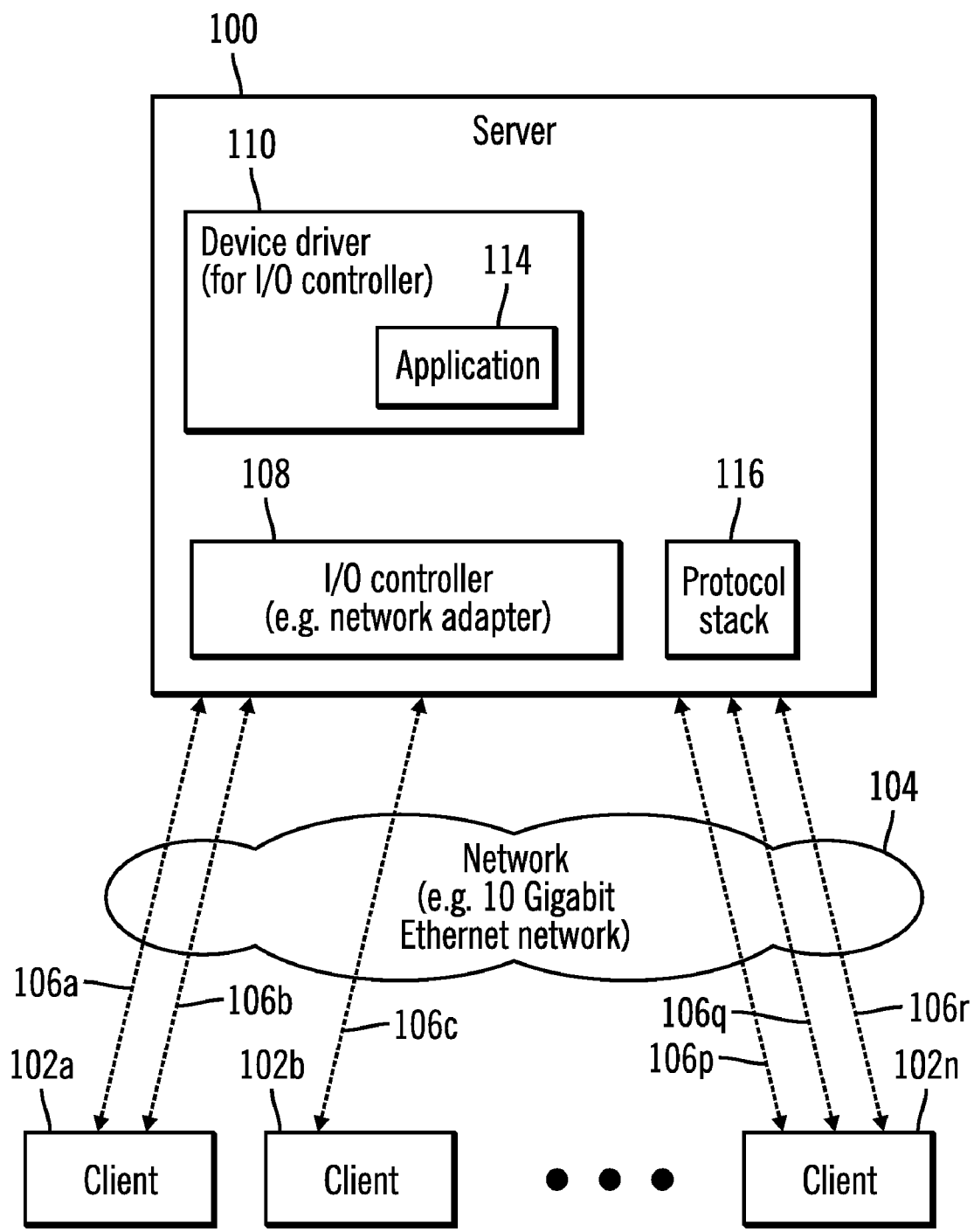
FIG. 1 illustrates a block diagram of a computing environment, in accordance with certain described embodiments of the invention.

FIG. 1 illustrates a block diagram of a computing environment, in accordance with certain described aspects of the invention. A server 100 is connected to a plurality of clients 102a . . . 102n over a network 104, such as a Gigabit Ethernet network. The server 100 may operate in a multi-session environment and at any time, each client 102a . . . 102n may have zero or more connections to the server 100. In FIG. 1, at a certain instant of time, the clients 102a . . . 102b have the network connections 106a . . . 106r to the server 100.

The server 100 and the clients 102a . . . 102n maybe any computational device known in the art, such as a personal computer, a workstation, a server, a mainframe, a hand held computer, a palm top computer, a telephony device, a network appliance etc. The clients 102a . . . 102n may also include printer, storage devices, and other hardware and software devices that may communicate with the server 100. The network 104 may be any network known in the art, such as the Internet, an intranet, a Local area network (LAN), a Storage area network (SAN), a Wide area network (WAN), a wireless network, etc. In certain embodiments, the network 104 is a high speed network such as a Gigabit Ethernet network.

In alternative embodiments, the server 100 may be connected to the clients 102a . . . 102n without a network, such as through direct lines, common bus systems etc., in a manner known in the art. Also the network 104 may be part of one or more larger networks or may be an independent network or may be comprised of multiple interconnected networks. While in the described embodiments, the clients 102a . . . 102n and the server 100 communicate within a client-server paradigm, the clients 102a . . . 102n and the server 100 may also communicate within a peer-to-peer or other network paradigm known in the art.

The server 100 has at least one I/O controller 108, where the I/O controller 108 establishes and maintains the network connections 106a . . . 106r between the server 100 and the clients 102a . . . 102n. In certain embodiments, the I/O controller 108 is a network adapter connected to a bus on the server 100. The I/O controller 108 receives and transmits data packets between the server 100 and the clients 102a . . . 102n over the network connections 106a . . . 106r. The server 100 also has a device driver 110 for the I/O controller 108, where the device driver acts as an interface between the I/O controller and the operating system (not shown) of the server 100.

An application 114 implementing an embodiment of the invention is coupled to the server 100. In one embodiment, the application 114 is included in the device driver 110. The application 114 may be written in any programming language known in the art and may be part of other applications or the I/O controller 108. The application 114 may also modify or add operations in a protocol stack 116 coupled to the server 100, where the protocol stack 116 processes packets delivered to the server 100 over the network connections 106a . . . 106r. In certain embodiments of the invention, the protocol stack 116 may include the application 114.

In many situations where the network 104 is a high speed network like a Gigabit Ethernet, the server 100 may not be able to process the maximum rate of data transmission over the network 104. Therefore, the application 114 may monitor the processing of packets received at the server 100 via the network connections 106a . . . 106r. Based on the monitoring, the application 114 may determine the network connections 106a . . . 106r that exhibit "slow" flow, i.e., those network connections whose packets take relatively more time to process on the server 100. For example, a network connection whose packets are received in an encrypted format may exhibit slow flow, whereas a network connection that is transmitting unencrypted data to the server 100 via the file transfer protocol may exhibit a "high" flow. Network connections 106a . . . 106r whose packets take relatively more time to process on the server may also be referred to as high latency network connections. Additionally, high latency network connections may require greater resources at the server 100.

In the system shown in FIG. 1 packets are transmitted from the clients 102a . . . 102n to the server 100. The I/O controller 108 processes the packets such that if the inbound packet rate is too high for the I/O controller 108 to process, one or more network connections 106a . . . 106r are eliminated by the I/O controller 108 via the application 114. The elimination is performed in a manner such that those network connections 106a . . . 106r that causes a high processing load on the I/O controller 108 are eliminated first. Therefore, the system attempts to maximize the throughput of packets across the network 104.

Figure 2:
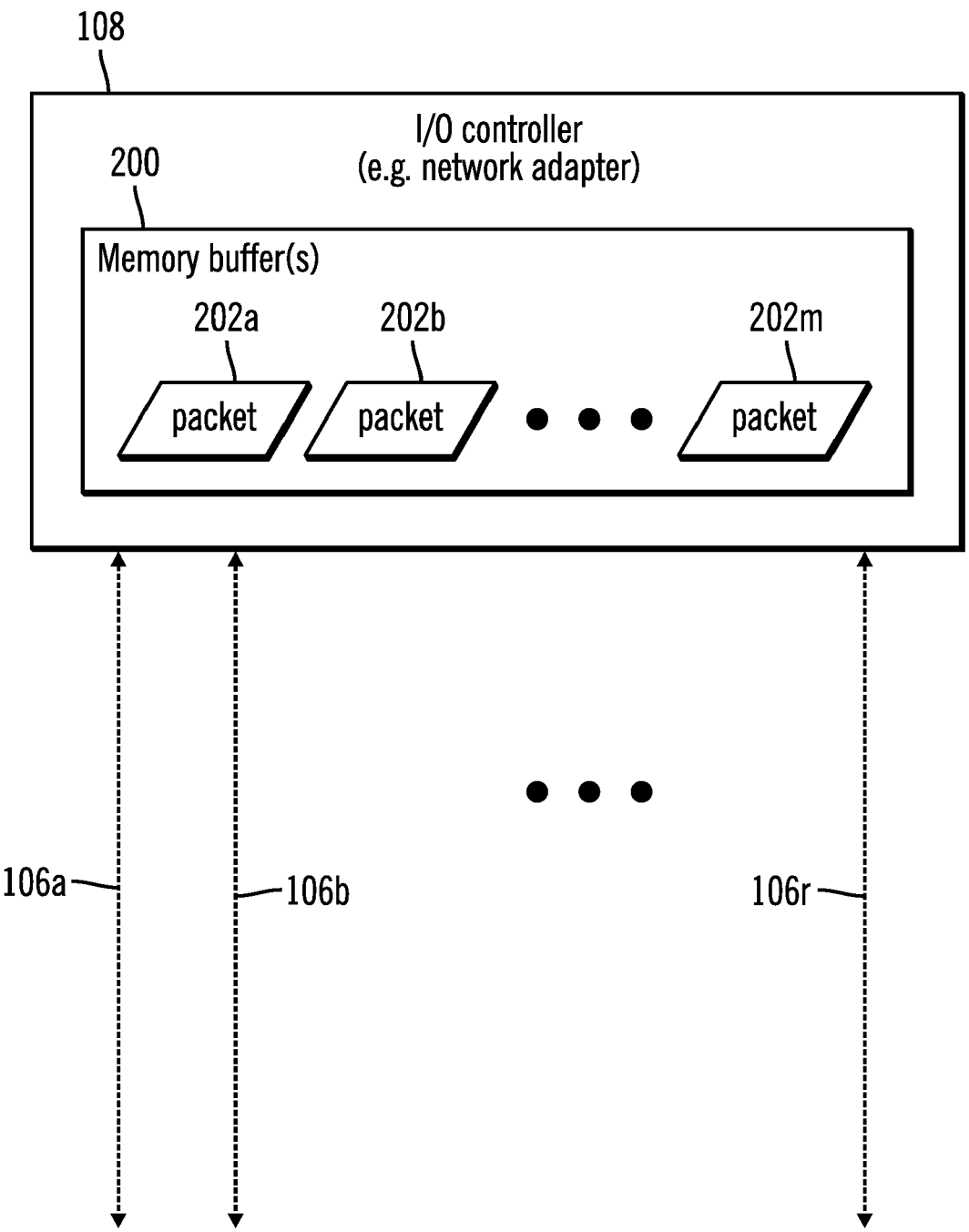
FIG. 2 illustrates a block diagram of an I/O controller having a memory buffer, in accordance with certain described embodiments of the invention.

FIG. 2 illustrates a block diagram of the I/O controller 108, in accordance with certain described embodiments of the invention. The I/O controller 108 has at least one memory buffer 200 allocated by the device driver 110. The device driver 110 may allocate the memory buffer 200 in system memory. As the memory buffer 200 is used, it may be replenished by the device driver 110. If the memory buffer 200 is not replenished and becomes exhausted, the I/O controller 108's on-chip buffering may be exceeded and packets sent to the server 100 may be dropped.

At any time, there are a maximum number of packets that the I/O controller 108 can buffer in the memory buffer 200. In FIG. 2, packets 202a . . . 202m received via the network connections 106a . . . 106r are shown to be buffered in the memory buffer 200.

The size of the memory buffer 200 may vary in embodiments and maybe 256K in certain embodiments. However, no matter what the size of the memory buffer 200 if the rate of inbound packets exceed the rate at which the I/O controller 108 can process the inbound packets, then the memory buffer 200 may be exceeded after a certain interval of time, and packet loss may occur.

While only one memory buffer 200 is shown in FIG. 2, in certain embodiments of the invention there may be more than one memory buffer. Nevertheless, there may be potential for packet loss when any or all of the plurality of memory buffers are full.

Figure 3:
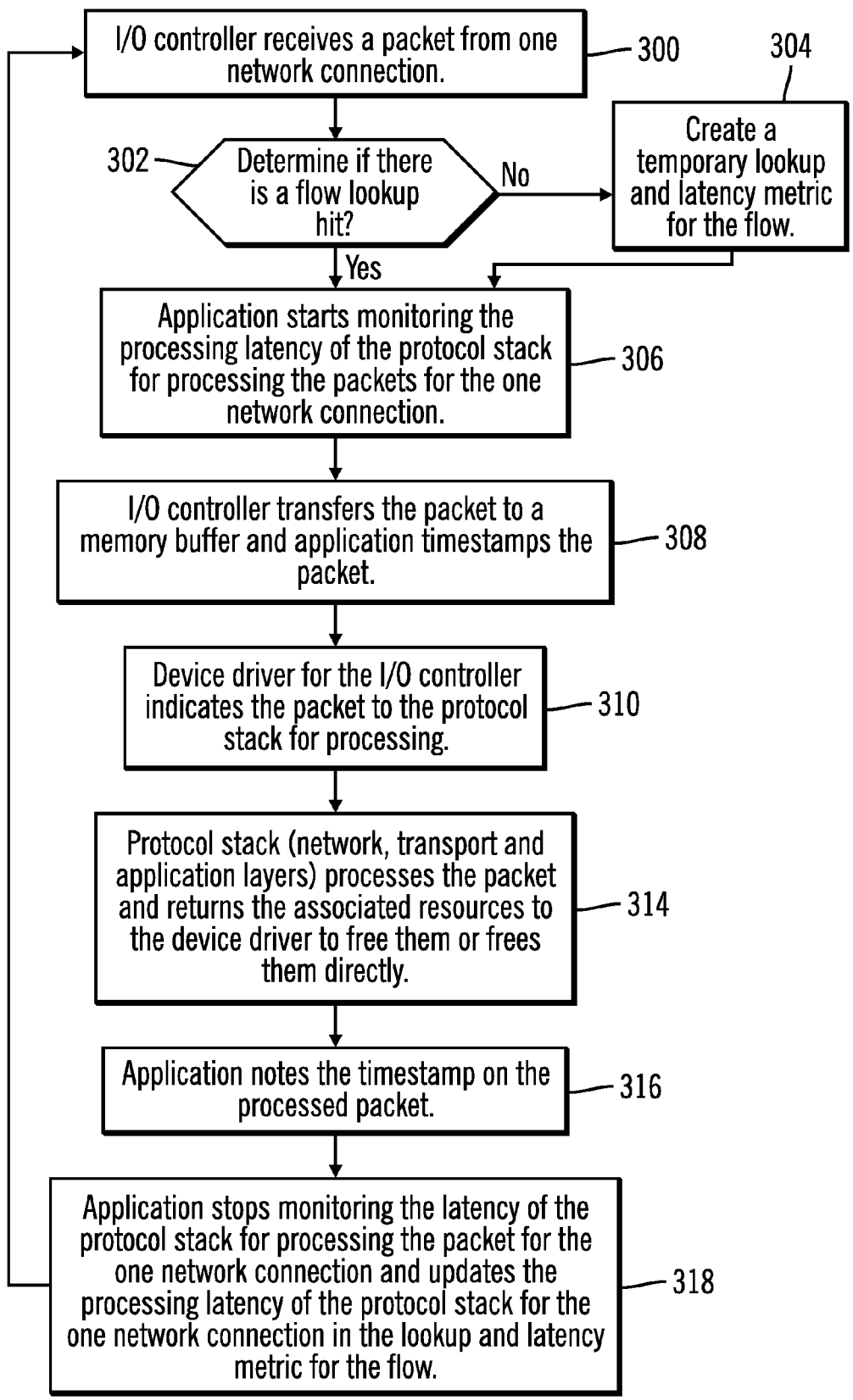
FIG. 3 illustrates a first logic for classifying and identifying flows based on processing latency, in accordance with certain described embodiments of the invention.

FIG. 3 illustrates a first logic for classifying and identifying flows based on processing latency in accordance with certain described embodiments of the invention. The logic may be implemented in the application 114.

Control starts at block 300 where the I/O controller 108 receives a packet via one network connection of the network connections 106a . . . 106r. Control proceeds to block 302 where the application 114 determines if there is a flow lookup hit, i.e., packets have been received earlier at the server 100 via the one network connection. In such a case, earlier information on the latency of processing at the server for the flow corresponding to the one network connection is available to the application 114.

If at block 302 a determination is made that there no flow lookup hit, i.e., there is a flow lookup miss, then control proceeds to block 304. At block 304, the application 114 creates a temporary lookup and latency metric for the flow associated with the one network connection. The received packet is the first packet to be received for which the latency metric would be computed for the flow. The latency metric indicates the rate at which packets for the flow corresponding to the one network connection are processed at the server 100.

If at block 302 a determination is made that there is a flow lookup hit, then control proceeds to block 306. Control also proceeds to block 306 from block 304. At block 306, the application starts monitoring the processing latency of the protocol stack 116 for processing the packets of the one network connection. The protocol stack 116 is coupled to the server 100 and is capable of processing packets received by the I/O controller 108.

Control proceeds to block 308, where the I/O controller 108 transfers the received packet to the memory buffer 200. In one embodiment of the invention, the application 114 time stamps the packet. Control proceeds to block 310, where the device driver 110 for the I/O controller 108 indicates the packet to the protocol stack 116 for processing. The network, transport and application layers of the protocol stack 116 processes the packet and returns (at block 314) the associated resources to the device driver 110 which frees the associated resources. In alternative embodiments the associated resources may be freed without sending them to the device driver 110.

Control proceeds to block 316 where the application 114 notes the timestamp on the processed packet. Control proceeds to block 318 where the application 114 stops monitoring the latency of the protocol stack 116 for processing the packet for the one network connection. The application 114 updates the processing latency of the protocol stack for the one network connection in the lookup and latency metric for the flow associated with the one network connection. Control returns to block 300.

The logic of FIG. 3 determines the time spent to process a packet arriving via a network connection and updates the latency metric of the flow. The latency metric for a network connection indicates the speed at which the server 100 processes packets arriving via the network connection. The logic of FIG. 3 is based on the timestamping the arriving packet and noting the timestamp after the packet is processed by the server 100. Since actual values are kept in the latency metric, the network connections 106a . . . 106r may be ordered based on the load created by the network connections 106a . . . 106r on the server 100.

Figure 4:
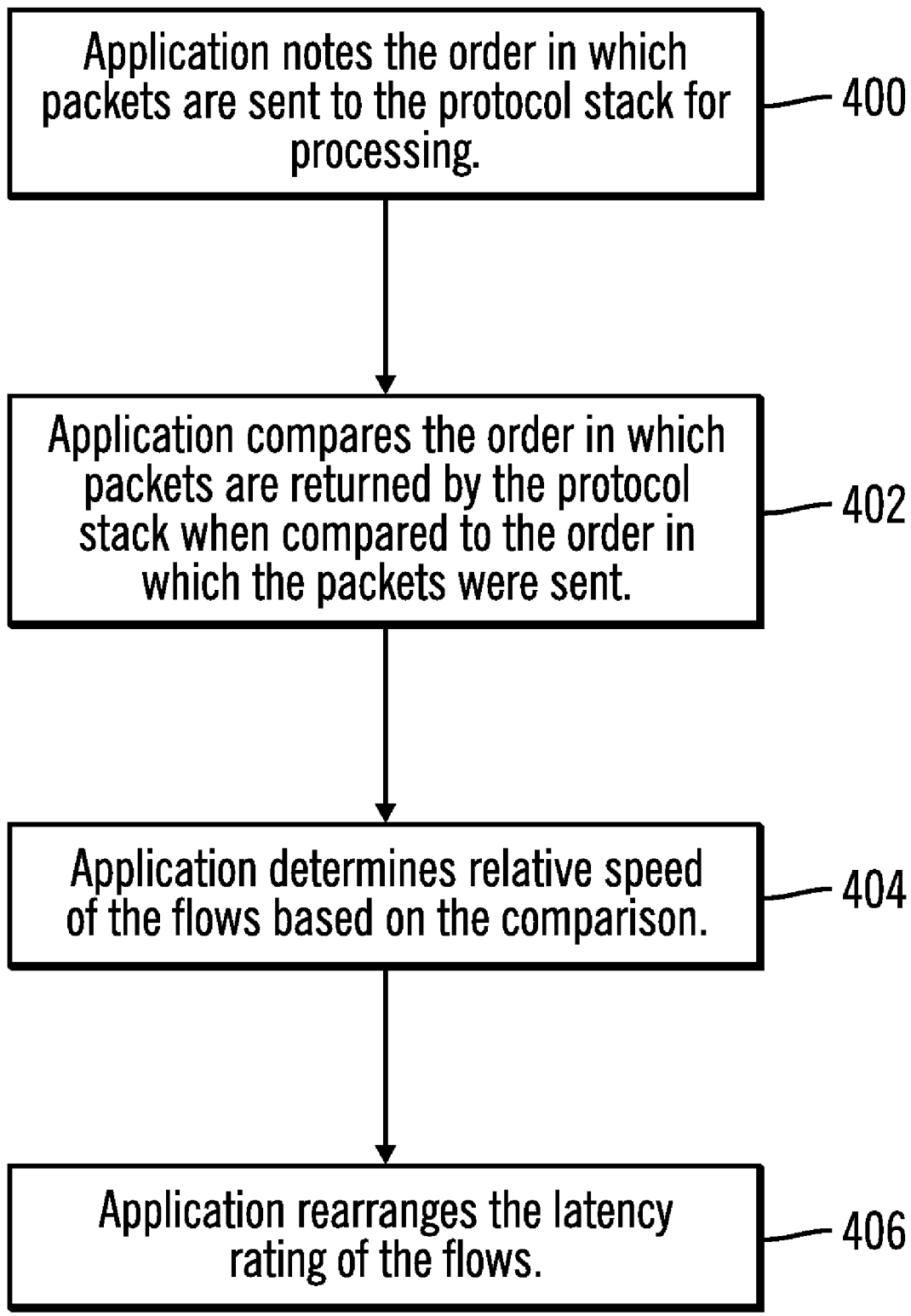
FIG. 4 illustrates a second logic for classifying and identifying flows based on processing latency, in accordance with certain described embodiments of the invention.

FIG. 4 illustrates a second logic for classifying and identifying flows based on processing latency, in accordance with certain described embodiments of the invention. The logic of FIG. 4 is implemented in the application 114 and maybe advantageous in situations where it is not necessary to create a precise ordering of the network connections 106a . . . 106r according to absolute values of flow processing latency kept in the latency metric via timestamping.

Since only a relative ranking of flow processing latency is needed and not an absolute determination of flow processing latency, the logic of FIG. 4 notes the order in which packets are indicated to the protocol stack 116 when compared to the order in which the packets are returned by the protocol stack. When packets are returned earlier in the order, then the corresponding flows are being processed faster than others. For example, if packets A, B, C are from three different flows and are indicated in the same order to the protocol stack 116 for processing but the protocol stack 116 returns the packets in the order B, C, A after processing, then flow A's latency rating would be made "slower."

Control starts at block 400, where the application 114 notes the order in which packets are sent to the protocol stack 116 for processing. The application 114 compares (at block 402) the order in which packets are returned by the protocol stack when compared to the order in which the packets were sent. Control proceeds to block 404, where the application 114 determines the relative speed of the flows based on the comparison. The application rearranges (at block 406) the latency rating of the flows.

In the logic of FIG. 4 the time required for timestamping in the logic of FIG. 3 is saved. Therefore, the logic of FIG. 4 may provide a relative ordering of the network connections 106*a* . . . 106*r* on the basis of the flow processing latency of the network connections 106*a* . . . 106*r* at the server 100.

Figure 5:
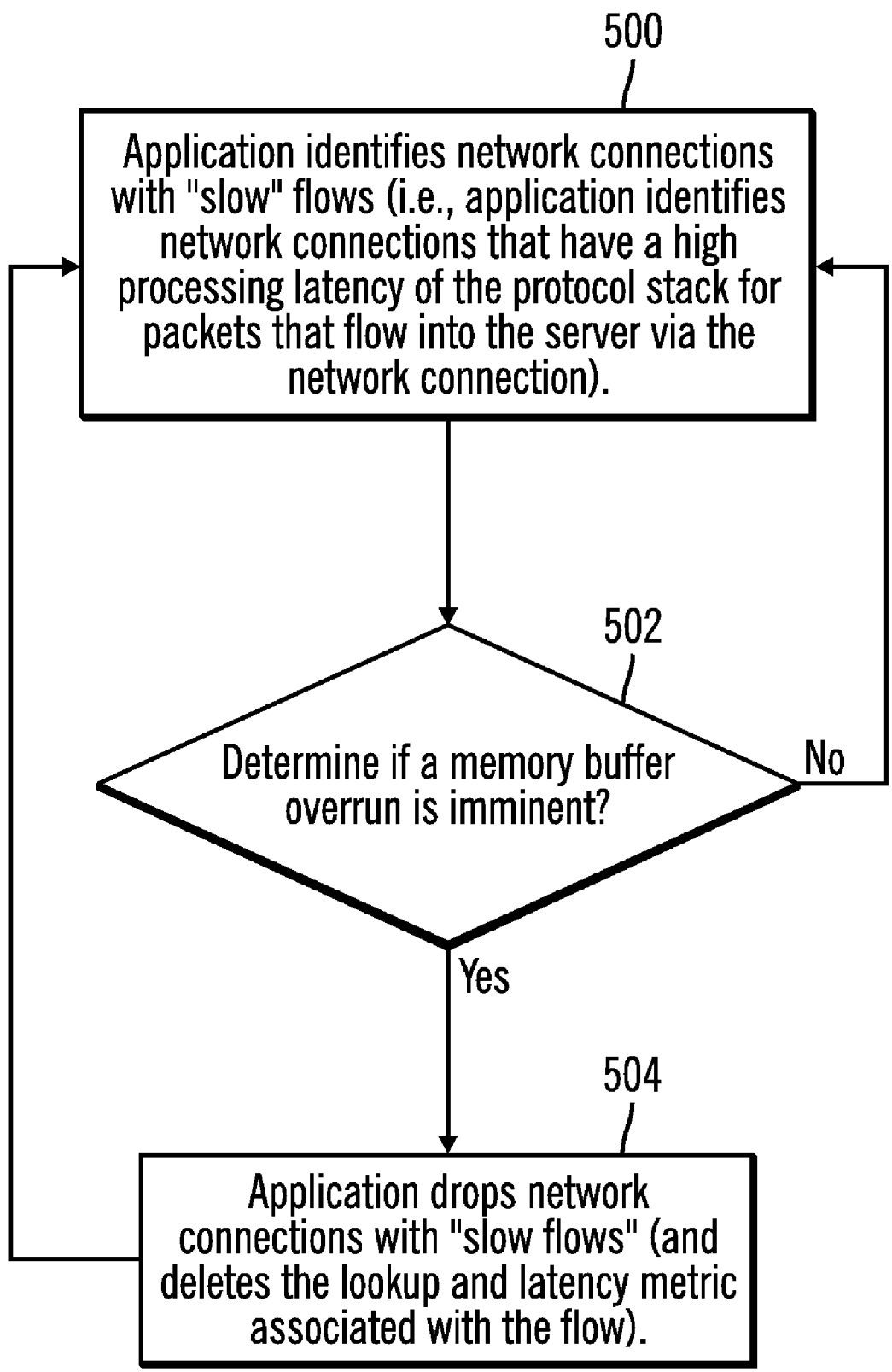
FIG. 5 illustrates logic for eliminating network connections exhibiting slow flows, in accordance with certain described embodiments of the invention.

FIG. 5 illustrates logic for eliminating network connections exhibiting "slow" flows, in accordance with certain described embodiments of the invention. The logic is implemented in the application 114.

The logic of FIG. 5 is directed towards dropping those network connections 106*a* . . . 106*r* that impose a high load on the server 100. A high throughput network connection, i.e., a network connection that is sending a large number of packets per second to the server 100, is likely to be preserved as long as the packets of the high throughput network connection require less processing on the server 100 when compared to slow throughput network connections. Although, a high throughput network connection may send a lot of packets quickly, the packets may also be processed quickly by the server 100. Therefore, the embodiment achieves a high throughput of data in the system by eliminating those network connections that overload the server 100. As a result, the network connections 106*a* . . . 106*r* that require fewer resources on the server 100 acquire a higher priority and are less likely to be eliminated.

Control starts at block 500 where the application 114 identifies network connections with "slow" flows, i.e., application 114 identifies those network connections that have a high processing latency of the protocol stack for packets that flow into the server 100 via the network connections. An ordering of the network connections 106*a* . . . 106*r* generated from the logic of FIG. 3 or FIG. 4 may allow the identification of the network connections with slow flows.

Control proceeds to block 502 where the application 114 determines if a memory buffer overrun is imminent for the memory buffer 200. For example, a memory buffer overrun may be imminent in certain embodiments where the memory buffer is more than 80% full. When a memory buffer overrun is imminent the I/O controller 108 is unable to process all the arriving packets rapidly enough and some network connections to the server 100 may have to be dropped.

If at block 502, a determination is made that a memory buffer overrun is imminent, then the application 114 drops network connections with "slow" flows. The application 114 eliminates network connections with "slow" flows from the ordered list of network connections that are ordered according to processing latency. In certain embodiments where lookup and latency metrics are associated with the flow the application 114 may also delete the lookup and latency metrics for the eliminated network connections.

The embodiments of the invention increases network throughput in a multi-session environment such as a server on a local area network. The embodiments identify the network connections (or sessions) that result in a high processing latency on the server and targets packets of these identified network connections as the packets to drop during low resource conditions. The embodiments thus free up resources such as network bandwidth and memory buffers for the network connections that require a lower processing latency on the server. High throughput connections are likely to be preserved if the associated flow requires a small amount of processing at the server. Thus, a larger number of network connections may be served by the server including those network connections having a high throughput. Therefore, the embodiments of the invention increases network throughput and reduces the load on the server.

Additional Embodiment Details

The described techniques may be implemented as a method, apparatus or article of manufacture using standard programming and/or engineering techniques to produce software, firmware, micro-code, hardware or any combination thereof The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, flash, firmware, programmable logic, etc.). Code in the computer readable medium is accessed and executed by a processor. The code in which embodiments are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the embodiments, and that the article of manufacture may comprise any information bearing medium known in the art.

Figure 6:
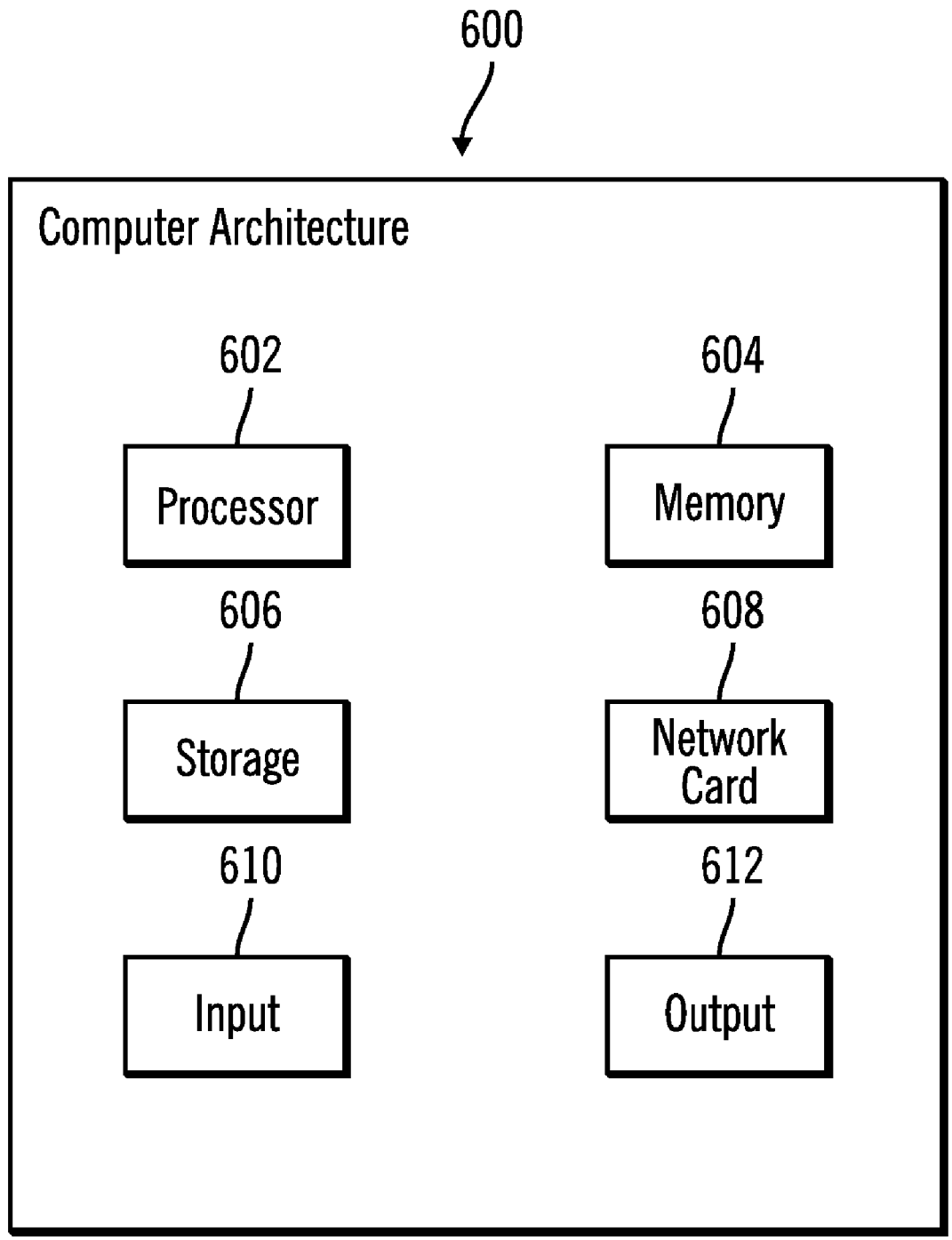
FIG. 6 illustrates a block diagram of a computer architecture in which certain described aspects of the invention are implemented.

FIG. 6 illustrates a block diagram of a computer architecture in which certain aspects of the invention are implemented. FIG. 6 illustrates one embodiment of the server 100 and the clients 102*a* . . . 102*n*. The server 100 and the clients 102*a* . . . 102*n* may implement a computer architecture 600 having a processor 602, a memory 604 (e.g., a volatile memory device), and storage 606. The storage 606 may include non-volatile memory devices (e.g., EEPROMs, ROMs, PROMs, RAMs, DRAMs, SRAMs, flash, firmware, programmable logic, etc.), magnetic disk drives, optical disk drives, tape drives, etc. The storage 606 may comprise an internal storage device, an attached storage device or a network accessible storage device. Programs in the storage 606 may be loaded into the memory 604 and executed by the processor 602 in a manner known in the art. The architecture may further include a network card 608 to enable communication with a network. The architecture may also include at least one input 610, such as a keyboard, a touchscreen, a pen, voice-activated input, etc., and at least one output 612, such as a display device, a speaker, a printer, etc.

The logic of FIGS. 3-5 describe specific operations occurring in a particular order. Further, the operations may be performed in parallel as well as sequentially. In alternative embodiments, certain of the logic operations may be performed in a different order, modified or removed and still implement embodiments of the present invention. Morever, steps may be added to the above described logic and still conform to the embodiments. Yet further steps may be performed by a single process or distributed processes.

Furthermore, many of the software and hardware components have been described in separate modules for purposes of illustration. Such components may be integrated into fewer number of components or divided into larger number of components. Additionally, certain operations described as performed by a specific component may be performed by other components.

The data structures and components shown or referred to in FIGS. 1-6 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing network throughput, comprising:
identifying at least one network connection of a plurality of network connections, wherein packets arriving via the one network connection require greater resources at a computational device relative to resources required by other network connections;
determining if resources required at the computational device by the plurality of network connections exceed a threshold; and
eliminating the at least one network connection to the computational device, wherein the threshold of resources is a percentage of usage of a memory buffer that is coupled to an Input/Output controller in the computational device, wherein the memory buffer holds unprocessed packets that arrive at the computational device, wherein a determination is made of time required to process a packet arriving via a first network connection, wherein based on the time required, a processing latency of the first network connection is determined, wherein the plurality of network connections are arranged based on processing latencies of the plurality of network connections, wherein a recordation is made of an order in which packets arriving at the computational device are sent for processing, wherein a comparison is made of the order in which the arrived packets are returned after processing relative to the order in which the packets were sent for processing, and wherein a relative processing latency of the plurality of network connections is determined.

2. The method of claim 1, wherein the computational device has an input/output controller to manage the network connections, wherein the network connections are to clients over a network, and wherein the network is a high-speed network that can deliver packets at a rate that exceeds a capacity of at least one resource the computational device can allocate to process the delivered packets.

3. The method of claim 1, further comprising:
computing processing latencies of the plurality of network connections, wherein a processing latency of a first network connection is the rate at which packets arriving via the first network connection are processed by the computational device, and wherein greater processing latency needs greater resources at the computational device.

4. The method of claim 1, further comprising:
deleting resource requirement information on the one network connection after the one network connection has been eliminated.

5. The method of claim 1, further comprising:
on establishing a new network connection to the computational device, ranking the new network connection relative to the plurality of network connections based on the resources required at the computational device by the new network connection.

6. A system for managing throughput to a computational device having a plurality of network connections, comprising:
an application managing the network connections, wherein the application identifies at least one network connection of the plurality of network connections, wherein packets arriving via the one network connection require greater resources at the computational device relative to resources required by other network connections;
a threshold indicating a level of resources used at the computational device, wherein the application eliminates the at least one network connection to the computational device if resources required at the computational device by the plurality of network connections exceed the threshold;
an Input/Output controller coupled to the computational device, wherein the Input/Output controller manages the network connections;
a memory buffer, wherein the threshold is a percentage of usage of the memory buffer, wherein the memory buffer holds unprocessed packets that arrive at the computational device;
a first network connection to the computational device;
a packet arriving via the first network connection to the computational device, wherein the application determines time required to process the packet and based on the time required, and determines a processing latency of the first network connection, and wherein the application arranges the plurality of network connections based on processing latencies of the plurality of network connections;
packets arriving at the computational device; and
a relative processing latency of the plurality of network connections, wherein the application records an order in which the packets arriving at the computational device are sent for processing, compares the order in which the arrived packets are returned after processing relative to the order in which the packets were sent for processing, and determines the relative processing latency of the plurality of network connections.

7. The system of claim 6, further comprising:
a device driver, wherein the device driver includes the application;
at least one resource coupled to the computational device;
a network, wherein the network connections connect the computational device to the network, and wherein the network is a high-speed network that can deliver packets at a rate that exceeds a capacity of the at least one resource to process the delivered packets; and
clients coupled to the computational device via the network connections, wherein the clients can send the packets to the computational device.

8. The system of claim 6, wherein the application computes processing latencies of the plurality of network connections, wherein a processing latency of a first network connection is the rate at which packets arriving via the first network connection are processed by the computational device, and wherein greater processing latency needs greater resources at the computational device.

9. The system of claim 6, wherein the application deletes resource requirement information on the one network connection after the one network connection has been eliminated.

10. The system of claim 6, further comprising:
a new connection established to the computational device, wherein the application ranks the new network connection relative to the plurality of network connections based on the resources required at the computational device by the new network connection.

11. A system, comprising:
a network;
a computer;
a plurality of network connections connecting the computer to the network;
an application executing in the computer and managing the network connections, wherein the application identifies at least one network connection of the plurality of network connections, wherein packets arriving via the one network connection require greater resources at the computer relative to resources required by other network connections;
a threshold implemented in the computer, wherein the threshold indicates a level of resources used at the computer, wherein the application eliminates the at least one network connection to the computer if resources required at the computer by the plurality of network connections exceed the threshold;
an Input/Output controller coupled to the computer, wherein the Input/Output controller manages the network connections;
a memory buffer, wherein the threshold is a percentage of usage of the memory buffer, wherein the memory buffer holds unprocessed packets that arrive at the computer;
a first network connection to the computer;
a packet arriving via the first network connection to the computer, wherein the application determines time required to process the packet and based on the time required, determines a processing latency of the first network connection, and wherein the application arranges the plurality of network connections based on processing latencies of the plurality of network connections; and
packets arriving at the computer, and a relative processing latency of the plurality of network connections, wherein the application records an order in which the packets arriving at the computer are sent for processing, compares the order in which the arrived packets are returned after processing relative to the order in which the packets were sent for processing, and determines the relative processing latency of the plurality of network connections.

12. The system of claim 11, further comprising:
a device driver, wherein the device driver includes the application;
at least one resource coupled to the computer;
a network, wherein the network connections connect the computer to the network, and wherein the network is a high-speed network that can deliver packets at a rate that exceeds a capacity of the at least one resource to process the delivered packets; and
clients coupled to the computer via the network connections, wherein the clients can send the packets to the computer.

13. The system of claim 11, wherein the application computes processing latencies of the plurality of network connections, wherein a processing latency of a first network connection is the rate at which packets arriving via the first network connection are processed by the computer, and wherein greater processing latency needs greater resources at the computer.

14. The system of claim 11, wherein the application deletes resource requirement information on the one network connection after the one network connection has been eliminated.

15. The system of claim 11, further comprising:
a new connection established to the computer, wherein the application ranks the new network connection relative to the plurality of network connections based on the resources required at the computer by the new network connection.

16. An article of manufacture for managing network throughput, wherein the article of manufacture is capable of causing operations, the operations comprising:
identifying at least one network connection of a plurality of network connections, wherein packets arriving via the one network connection require greater resources at a computational device relative to resources required by other network connections;
determining if resources required at the computational device by the plurality of network connections exceed a threshold; and
eliminating the at least one network connection to the computational device, wherein the threshold of resources is a percentage of usage of a memory buffer that is coupled to an Input/Output controller in the computational device, wherein the memory buffer holds unprocessed packets that arrive at the computational device, wherein a determination is made of time required to process a packet arriving via a first network connection, wherein based on the time required, a processing latency of the first network connection is determined, wherein the plurality of network connections are arranged based on processing latencies of the plurality of network connections, wherein a recordation is made of an order in which packets arriving at the computational device are sent for processing, wherein a comparison is made of the order in which the arrived packets are returned after processing relative to the order in which the packets were sent for processing, and wherein a relative processing latency of the plurality of network connections is determined.

17. The article of manufacture of claim 16, wherein the computational device has an input/output controller to manage the network connections, wherein the network connections are to clients over a network, and wherein the network is a high-speed network that can deliver packets at a rate that exceeds a capacity of at least one resource the computational device can allocate to process the delivered packets.

18. The article of manufacture of claim 16, wherein the article of manufacture further performs:
computing processing latencies of the plurality of network connections, wherein a processing latency of a first network connection is the rate at which packets arriving via the first network connection are processed by the computational device, and wherein greater processing latency needs greater resources at the computational device.

19. The article of manufacture of claim 16, wherein the article of manufacture further performs:
   deleting resource requirement information on the one network connection after the one network connection has been eliminated.

20. The article of manufacture of claim 16, wherein the article of manufacture further performs:
   on establishing a new network connection to the computational device, ranking the new network connection relative to the plurality of network connections based on the resources required at the computational device by the new network connection.

* * * * *